United States Patent [19]

Hagen

[11] Patent Number: 5,027,239
[45] Date of Patent: Jun. 25, 1991

[54] ROUTING A SLEEVE AND CONDUCTORS IN A HEAD-GIMBAL ASSEMBLY

[75] Inventor: Tracy M. Hagen, Minnetonka, Minn.

[73] Assignee: Seagate Technology, Inc., Scotts Valley, Calif.

[21] Appl. No.: 456,099

[22] Filed: Dec. 22, 1989

[51] Int. Cl.⁵ ............................................... G11B 5/48
[52] U.S. Cl. ..................................... 360/104; 360/108
[58] Field of Search ......................... 360/104, 106, 108

[56] References Cited

U.S. PATENT DOCUMENTS 4,755,892 7/1988 Carteau et al. .
4,853,811 8/1989 Brooks ........................... 360/104 X

FOREIGN PATENT DOCUMENTS

2073501 10/1981 United Kingdom .
2123984 2/1984 United Kingdom .
0232916 8/1987 United Kingdom .

Primary Examiner—A. J. Heinz
Attorney, Agent, or Firm—Kinney & Lange

[57] ABSTRACT

A sleeve capture apparatus is provided for use with a load beam. The load beam couples a gimbal to a support arm in a head-gimbal assembly and the sleeve capture apparatus supports a conductor sleeve running from the gimbal to the support arm along the load beam. A first capture member extends from an edge of the load beam and has a sleeve contact surface for contacting the conductor sleeve. A second capture member also extends from the edge of the load beam and has a sleeve contact surface for contacting the conductor sleeve. A third capture member extends from the edge of the load beam and has a sleeve contact surface for contacting the conductor sleeve. The second capture member has its sleeve contact surface displaced from a line defined generally by the sleeve contact surfaces of the first and third capture members. It is displaced by a distance less than the thickness of the conductor sleeve.

50 Claims, 7 Drawing Sheets

ROUTING A SLEEVE AND CONDUCTORS IN A HEAD-GIMBAL ASSEMBLY

BACKGROUND OF THE INVENTION

This invention relates to a head-gimbal assembly in a hard disk file. More particularly, the invention relates to routing conductors and a conductor sleeve running from a gimbal to a support arm along a load beam in the head-gimbal assembly.

A head-gimbal assembly (HGA) used in a hard disk file consists essentially of three components. The first component is a slider which features a self-acting hydrodynamic air bearing and an electromagnetic transducer used for recording and retrieving information from a spinning magnetic disk.

The second component is a gimbal which is attached to the slider. The gimbal is resilient in the slider's pitch and roll directions to allow the slider to follow the topography of the disk over which it is flying. Also, the gimbal is rigid in the in-plane directions for maintaining precise in-plane slider positioning.

The third component is a load beam which is attached to the gimbal and to a support arm. The load beam is connected to the support arm by a well known technique referred to as swaging or ball staking. The load beam is resilient in the vertical direction. This resiliency allows the slider to follow the topography of the disk. As with the gimbal, the load beam is rigid in the in-plane directions. The load beam also acts as a spring supplying a downward force that counteracts the hydrodynamic lifting force developed by the air bearing.

Electrical signals are sent to and received from the electromagnetic transducer via very small conductors. The conductors are typically twisted copper wires. There are usually two conductors, but the number of conductors may vary.

The wires are routed generally along a longitudinal axis of the load beam from the transducer to the support arm. The wires are placed inside a flexible sleeve or tube to protect them from being damaged. The conductor sleeve or tube is secured to the load beam by bendable metal tabs. HGA's typically have one metal tab at the end of the load beam nearest the slider, another around the longitudinal mid-point of the load beam and two more at the end of the load beam nearest the support arm.

The two metal tabs which secure the conductor sleeve to the load beam at the end nearest the support arm are generally formed integrally with the load beam and are formed in a U-shape by the load beam manufacturer. The U-shape of the capture tabs facilitates placement of the conductor sleeve into the tabs during assembly of the HGA. As one step in the assembly of the HGA, the U-shape capture tabs are bent closed around the conductor sleeve to prevent the conductor sleeve from escaping during subsequent handling of the HGA.

However, prior to the ball staking operation, a mounting plate is welded to the load beam. Then, during the ball staking operation, clamps are applied to certain portions of the load beam and the mounting plate. To facilitate proper execution of the ball-staking technique, the capture tabs must maintain certain clearances from the surfaces of the load beam and the mounting plate. The critical clearances are related to the thickness and size of the capture tabs with respect to the load beam and the mounting plate. If these clearances are not maintained, the capture tabs interfere with the clamps used in the ball-staking operation causing alignment errors.

Mere closure of the capture tabs around the conductor sleeve does not compress the tabs enough to provide the necessary clearances. Therefore, an additional operation must be performed. After the capture tabs are closed, they must be compressed until they provide the necessary clearances.

The compression, however, alters the substantially round cross-sectional shape of the closed capture tabs into an oblong shape. This often results in the formation of undesirable metal burrs on the capture tabs which must be removed by hand. In addition, the compression operation significantly distorts the conductor sleeve and frequently damages it. In some cases, the conductors inside the conductor sleeve are crushed and damaged as well.

SUMMARY OF THE INVENTION

The present invention provides a sleeve capture apparatus suitable for use with a load beam in a head-gimbal assembly. The apparatus is not required to undergo compression to comply with necessary clearances.

The sleeve capture apparatus supports a conductor sleeve running from a gimbal to a support arm along the load beam. A first capture member extends from an edge of the load beam and has a sleeve contact surface for supporting the conductor sleeve in a first direction. A second capture member extends from the edge of the load beam and has a sleeve contact surface for supporting the conductor sleeve in a second direction. The first and second directions are generally opposite one another. A third capture member extends from the edge of the load beam and has a sleeve contact surface for supporting the conductor sleeve in the first direction. The conductor sleeve is supported by the sleeve capture apparatus along a support axis which is generally transverse to the first and second directions.

DETAILED DESCRIPTION OF THE PREFERRED EMBODIMENTS

Figure 1:
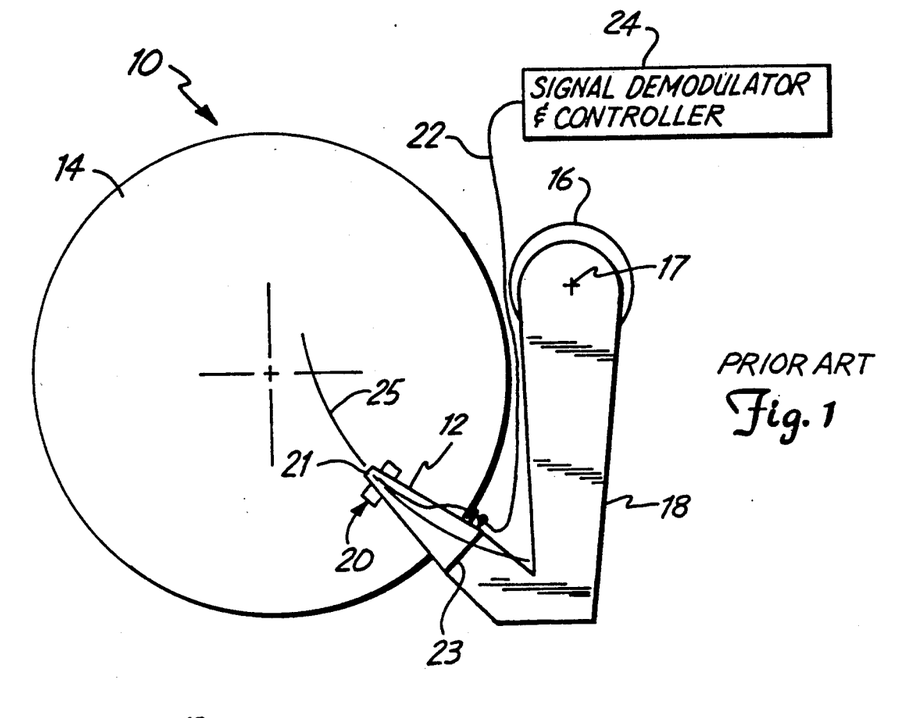
FIG. 1 is a top view of a magnetic disk in a hard disk file with an associated support arm and head-gimbal assembly.

FIG. 1 shows hard disk file rotary positioning system 10 with load beam 12 of the prior art. Positioning system 10 includes load beam 12, disk 14, rotary actuator 16, support arm 18, slider 20, conductor sleeve 22 and signal demodulator and controller 24. Slider 20 carries an electromagnetic transducer 28 (See FIG. 2A) which flies over the surface of disk 14 as disk 14 rotates. Slider 20 is coupled to end 21 of load beam 12 by a gimbal (discussed in greater detail later). Load beam 12 is, in turn, coupled at end 23 to support arm 18 by a known technique referred to as swaging or ball staking. As rotary actuator 16 pivots about axis 17, slider 20 moves over disk 14 along arc 25 to permit reading from or writing to different tracks on disk 14.

Signals are written on and retrieved from disk 14 using electromagnetic transducer 28. Electrical signals are provided to and received from electromagnetic transducer 28 from signal demodulator and controller 24 via conductors within conductor sleeve 22.

Figures 2A, 2B:
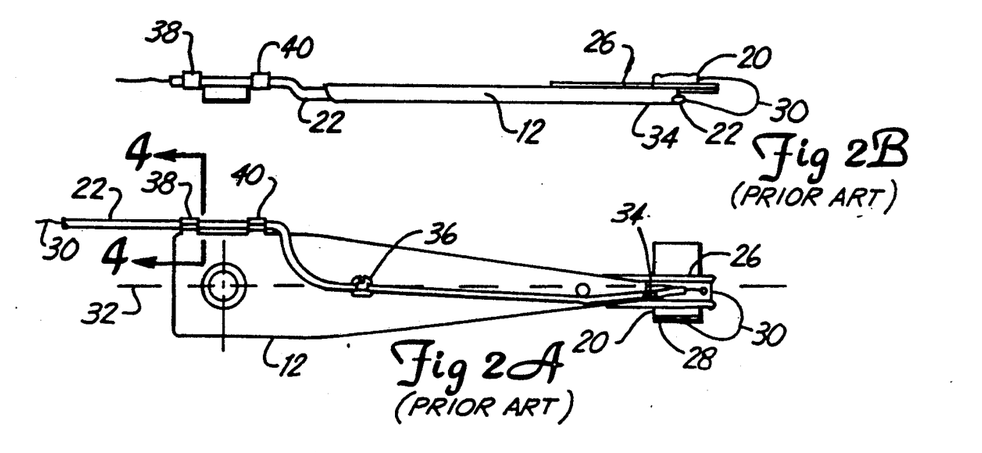
FIG. 2A is a bottom view of the head-gimbal assembly shown in FIG. 1.
FIG. 2B is a side view of the head-gimbal assembly shown in FIG. 2A.

FIG. 2A is an enlarged, more detailed view of the head-gimbal assembly shown in FIG. 1. Load beam 12 is coupled, typically laser welded, to gimbal 26. Gimbal 26, in turn, is coupled, typically glued, to slider 20. Slider 20 carries electromagnetic transducer 28 for reading from and writing to disk 14. Electric signals are provided to and received from electromagnetic transducer 28 via conductors 30 which are typically twisted wires. Conductors 30 are threaded through conductor sleeve 22, which protects conductors 30 and helps prevent them from being damaged. Conductor sleeve 22 is generally made from extruded polytetrafluoroethylene, sometimes referred to as Teflon TFE.

Load beam 12 is typically provided with four capture tabs for securing conductor sleeve 22 to load beam 12. The four capture tabs secure conductor sleeve 22 to load beam 12 to support it as it runs generally along longitudinal axis 32 of load beam 12 between transducer 28 and support arm 18. The capture tabs include first metal tab 36 and second metal tab 34. Metal tabs 34 and 36 are typically thin, bendable metal tabs. During production of the head-gimbal assembly, a production person (an assembler) places conductor sleeve 22 adjacent metal tabs 34 and 36 and bends metal tabs 34 and 36 over conductor sleeve 22 to secure it in place.

The capture tabs also include formed tabs 38 and 40 which are typically manufactured in a semi-circle shape. The assembler places conductor sleeve 22 within the semi-circular capture tabs 38 and 40 and bends tabs 38 and 40 closed or nearly closed around conductor sleeve 22. Capture tabs 38 and 40 must be closed sufficiently to prevent conductor sleeve 22 from sliding or moving longitudinally within tabs 38 and 40. Also, capture tabs 38 and 40 must be closed sufficiently to hold conductor sleeve 22 within the tabs so that conductor sleeve 22 does not come loose during subsequent assembly and handling of the HGA.

Figure 2C:
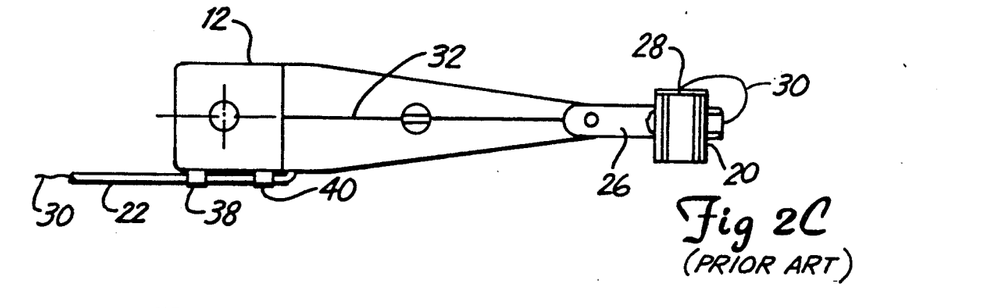
FIG. 2C is a top view of the head-gimbal assembly shown in FIG. 2A.

FIG. 2B is a side view of the head-gimbal assembly shown in FIG. 2A. FIG. 2C is a bottom view of the head-gimbal assembly shown in FIG. 2A. FIGS. 2B and 2C use the same reference numerals for the elements described in FIG. 2A.

Figure 2D:
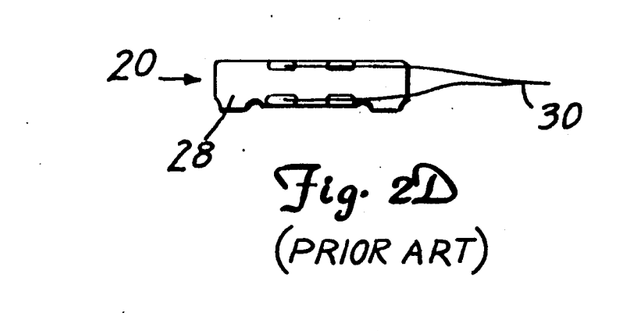
FIG. 2D is a side view showing conductor connections to a slider of the head-gimbal assembly shown in FIG. 2A.

FIG. 2D shows the connections of conductors 30 to the electromagnetic transducer 28 of slider 20. Typically, the conductors 30 are ultrasonically bonded to connector pads on the electromagnetic transducer 28.

Figure 3:
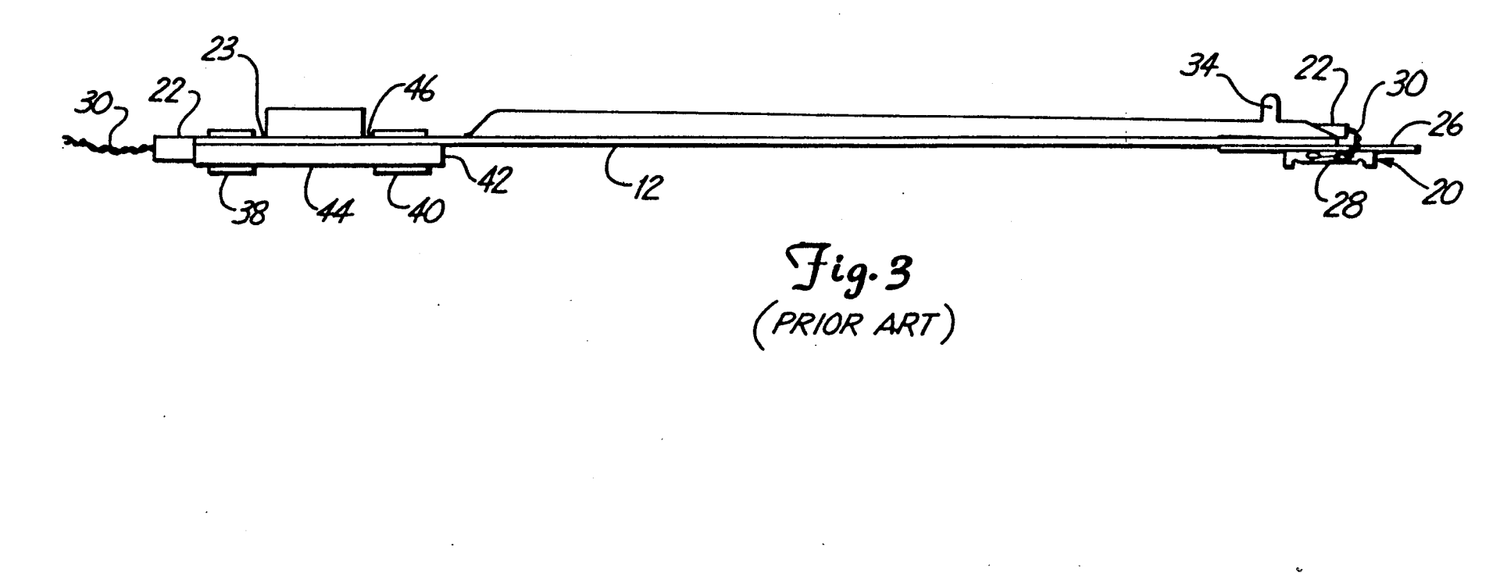
FIG. 3 is the opposite side view of head-gimbal assembly shown in FIG. 2B.

FIG. 3 is a side view of the head-gimbal assembly of FIG. 2A. FIG. 3 shows the opposite side to that shown in FIG. 2B. Since ball-staking is used to attach load beam 12 to support arm 18 (shown in FIG. 1), a mounting plate 42 is coupled (typically laser welded) to end 23 of load beam 12 to facilitate the ball-staking process. During the ball staking process, clamps interface with surfaces 44 and 46. Therefore, for the ball-staking technique to work effectively, the plane of surface 44 of mounting plate 42 and the plane of surface 46 of load beam 12 must be free from interference by capture tabs 38 and 40. Otherwise, improper and misaligned connection may result between load beam 12 and support arm 18.

As FIG. 3 shows, the capture tabs 38 and 40 protrude above the plane of surface 46 and below the plane of surface 44. Hence, the capture tabs of the prior art must be compressed to provide proper clearance between themselves and the planes of surfaces 44 and 46. Therefore, during assembly, after capture tabs 38 and 40 are closed around conductor sleeve 22, the assembler compresses capture tabs 38 and 40 to a proper thickness into an oblong cross-sectional shape.

Figure 4A:
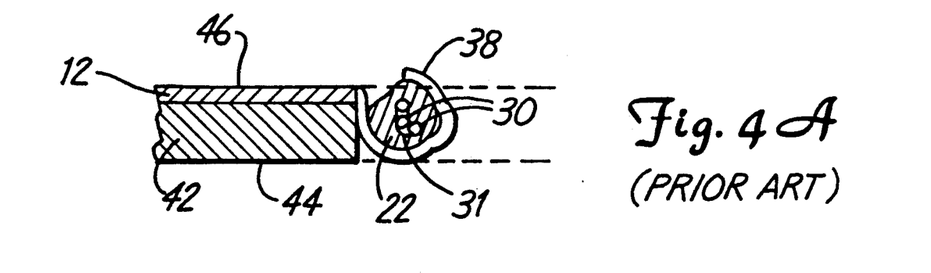
FIG. 4A shows a crimped capture tab of the prior art which is unacceptable.

FIGS. 4A–4D show cross-sectional views of compressed capture tabs taken along section line 4—4 in FIG. 2A. FIG. 4A shows capture tab 38 which is not acceptably compressed. In order to be properly compressed, so that it does not interfere with the ball-staking technique, capture tab 38 must be compressed between the planes of surfaces 44 and 46 with some additional clearance to accommodate production tolerances. In FIG. 4A, capture tab 38 has been closed sufficiently to hold conductors 30 and conductor sleeve 22. However, capture tab 38 has not been sufficiently compressed. It is protruding above the plane of surface 46 and will, therefore, interfere with the ball-staking technique.

Figure 4B:
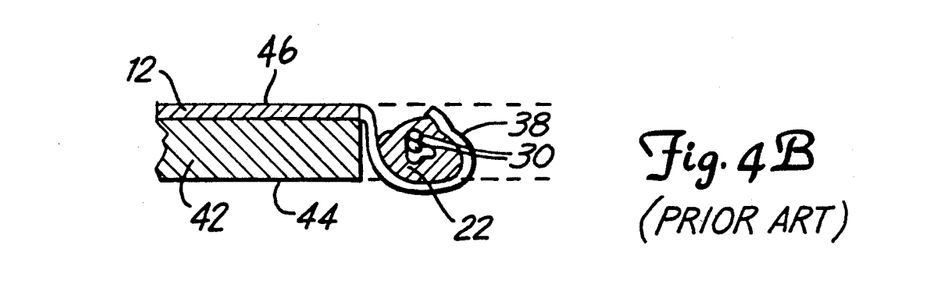
FIG. 4B shows a crimped capture tab of the prior art which is unacceptable.

FIG. 4B shows a second, unacceptable capture tab. In FIG. 4B, capture tab 38 has been compressed, but extends below the plane of surface 44 of mounting plate 42. Therefore, capture tab 38 will again interfere with the ball-staking technique.

Figure 4C:
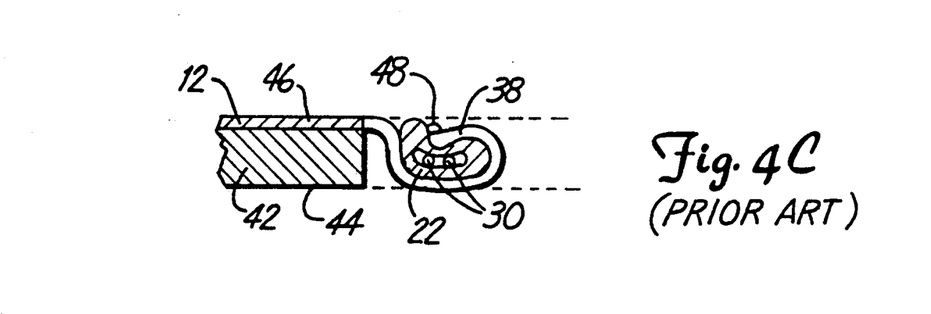
FIG. 4C shows a crimped capture tab of the prior art.

FIG. 4C shows several drawbacks of the prior art capture tabs. FIG. 4C shows capture tab 38 which has been compressed sufficiently to remain within the planes of surfaces 44 and 46. However, capture tab 38 has protruded into sleeve 22, and can damage sleeve 22. If capture tab 38 protrudes far enough into sleeve 22, it can damage or break conductors 30.

FIG. 4C also shows another problem which occurs as a result of compression. Upon being compressed, the surface of the bendable material forming capture tab 38 fractures or deforms under the pressure of the compression tool. This results in undesirable metal burrs, such as burr 48, forming on the surface of capture tab 38. An additional step must be added to the assembly process to remove burr 48 by hand.

Figure 4D:
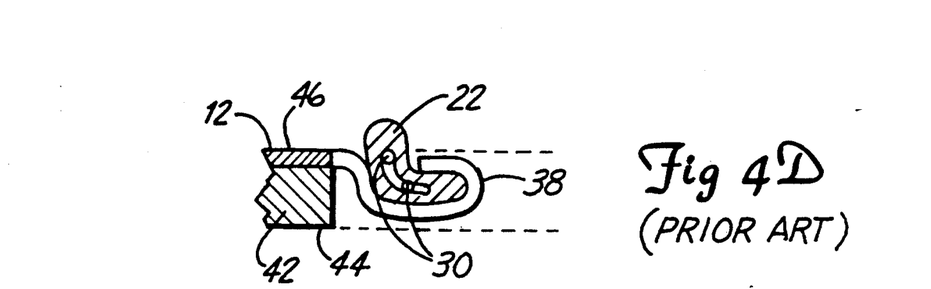
FIG. 4D shows a crimped capture tab of the prior art which is unacceptable.

FIG. 4D illustrates another problem resulting from the compression technique used in the prior art. Capture tab 38, in FIG. 4D, has been over compressed causing conductor sleeve 22 to bulge out from within capture tab 38. This not only causes conductor sleeve 22 to break the plane of surface 46 and interfere with the ball-staking operation, but it also damages conductor sleeve 22. If compressed far enough, capture tab 38 would damage or break conductors 30 within conductor sleeve 22.

All of the problems shown in FIGS. 4A-4D result in unacceptable head-gimbal assemblies. In order to remedy the problems, additional steps must be taken during assembly to reposition capture tab 38 or remove metal burr 48 from capture tab 38. Also, if conductor sleeve 22 is crushed too far and conductors 30 are damaged, the head gimbal assembly must be scrapped.

Figure 5A:
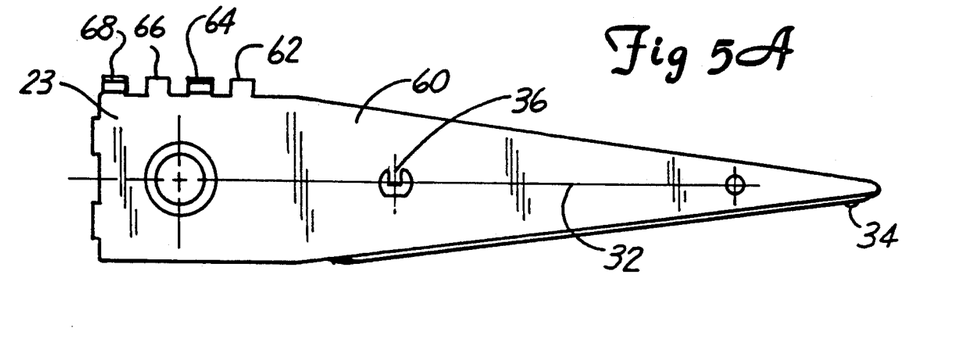
FIG. 5A is a bottom view of the load beam of the present invention.

FIG. 5A shows a bottom view of load beam 60 of the present invention. Some of the elements of load beam 60 are the same as those on load beam 12 of the prior art and are given corresponding reference numerals. Load beam 60 is provided with bendable metal capture tabs 34 and 36 which function the same as those shown on load beam 12.

However, instead of capture tabs 38 and 40, load beam 60 is provided with four capture members 62, 64, 66 and 68 at end 23. Capture members 62 and 66 are flat tabs which extend from the edge of load beam 60. Capture members 64 and 68 also extend from the edge of load beam 60. However, in this preferred embodiment, capture members 64 and 68 are formed in the shape of hooks for supporting conductor sleeve 22.

Figure 5B:
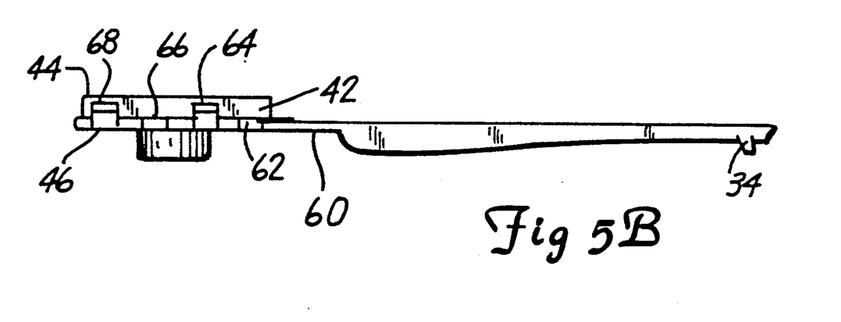
FIG. 5B is a side view of the load beam shown in FIG. 5A.

FIG. 5B is a side view of load beam 60. FIG. 5B shows that, although capture tabs 62 and 66 extend out from the edge of load beam 60, they remain substantially in the same plane as load beam 60. However, capture members 64 and 68 extend both away from the edge of load beam 60 and up, out of the plane of load beam 60. However, members 64 and 68 are manufactured so they do not break the plane of either surface 44 or surface 46.

Figure 6:
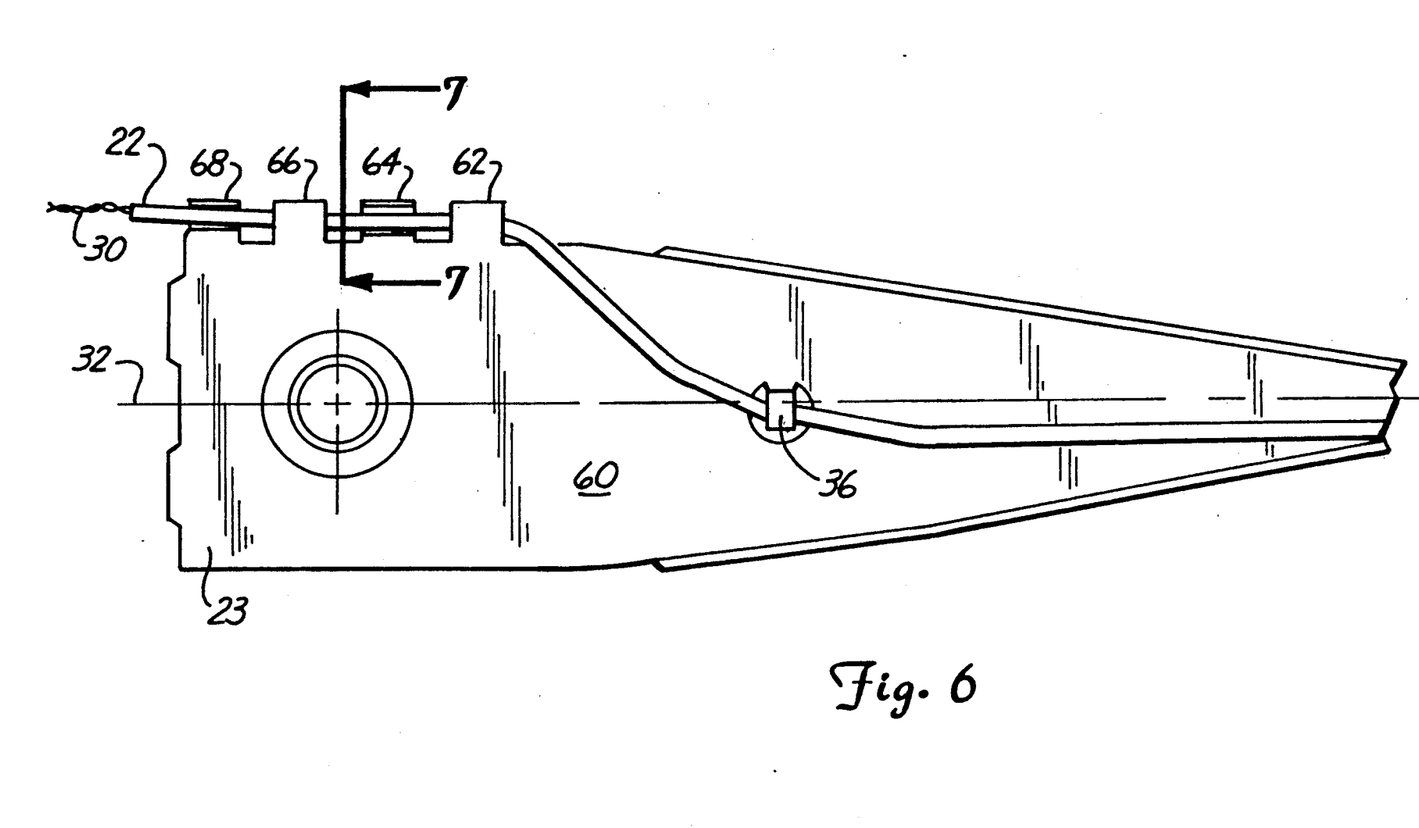
FIG. 6 is an enlarged bottom view of the load beam of the present invention showing a mounted conductor sleeve.

FIG. 6 is an enlarged bottom view of end 23 of load beam 60 showing conductor sleeve 22 secured to load beam 60 by capture members 62, 64, 66 and 68. As with load beam 12, the assembler places conductor sleeve 22 adjacent metal tabs 34 and 36. Then, the assembler bends metal tabs 34 and 36 over conductor sleeve 22 to secure conductor sleeve 22 to load beam 60. However, rather than threading conductor sleeve 22 through capture tabs 38 and 40, closing those tabs and compressing them, as in the prior art, the assembler merely threads conductor sleeve 22 through capture tabs 62, 64, 66 and 68. FIG. 6 shows that conductor sleeve 22 is placed under capture tab 62, then threaded up through the hook portion of capture tab 64, then under capture tab 66 and finally, up through the hook portion of capture tab 68.

Figure 7:
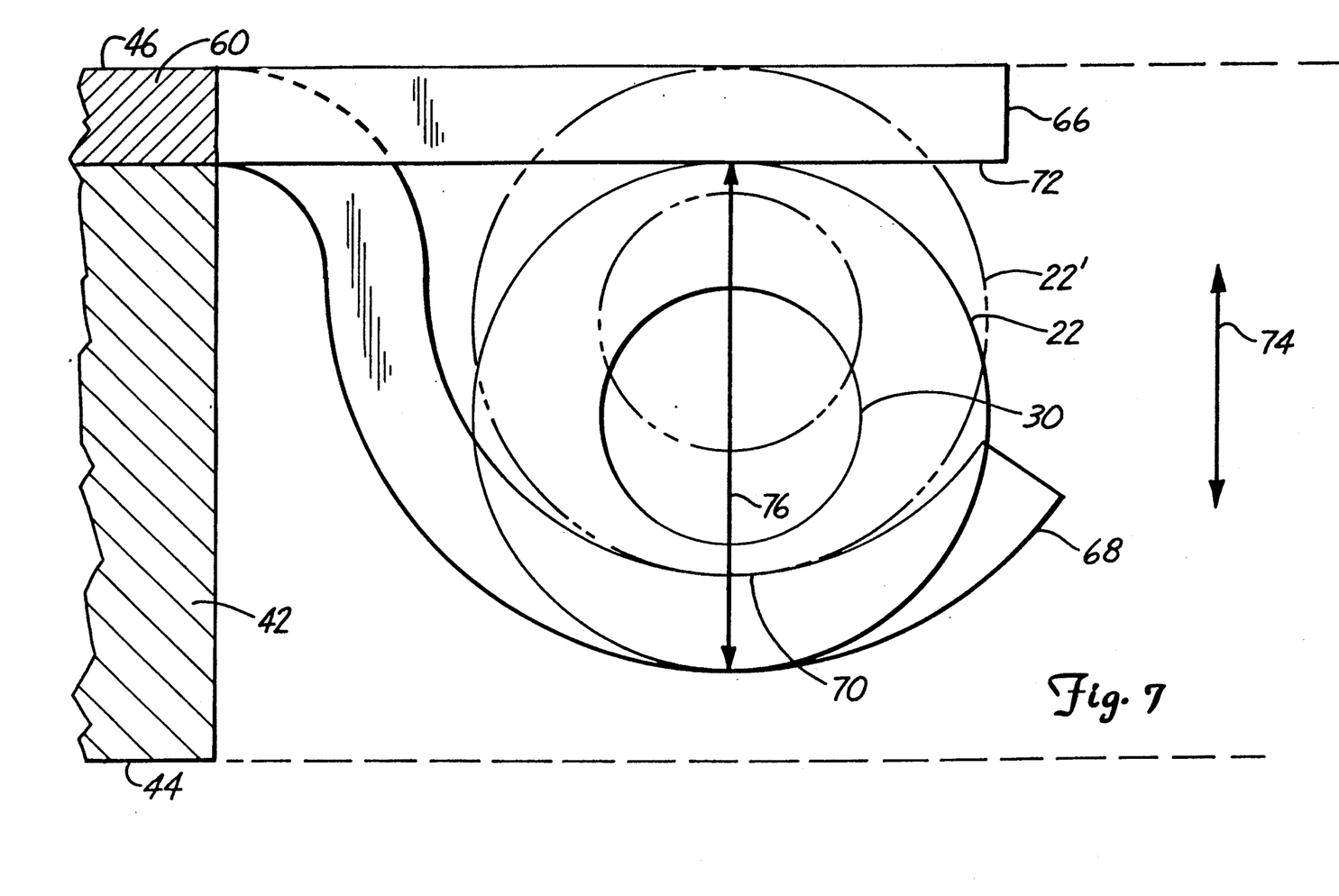
FIG. 7 is an enlarged sectional view taken along section 7—7 in FIG. 6.

FIG. 7 is a greatly enlarged sectional view taken along section line 7—7 in FIG. 6. In the embodiment shown, capture tab 68 has a curved or bent contact surface 70 for contacting conductor sleeve 22. Tab 66 has a substantially flat contact surface 72 for contacting conductor sleeve 22. Contact surface 70 of capture tab 68 is displaced from contact surface 72 of capture tab 66 in the vertical direction (given the orientation of load beam 60 in FIG. 7), as shown by arrow 74. In this preferred embodiment, the maximum distance of displacement between contact surfaces 70 and 72 is less than the total diameter 76 of conductor sleeve 22 and conductors 30. This results in the vertical position of conductor sleeve 22 varying with the longitudinal position of conductor sleeve 22 along the edge of load beam 60. For example, the vertical position of conductor sleeve 22, at the point where it contacts surface 72, is closer to the plane of surface 44 than the vertical position of sleeve 22 at the point where it contacts surface 70. The vertical position of sleeve 22 at the point where it contacts surface 70 is shown in phantom as 22' in FIG. 7.

In other words, the vertical position of sleeve 22 varies as it is threaded under tab 66, contacting surface 72, and as it is threaded over tab 68, contacting surface 70.

Figure 8:
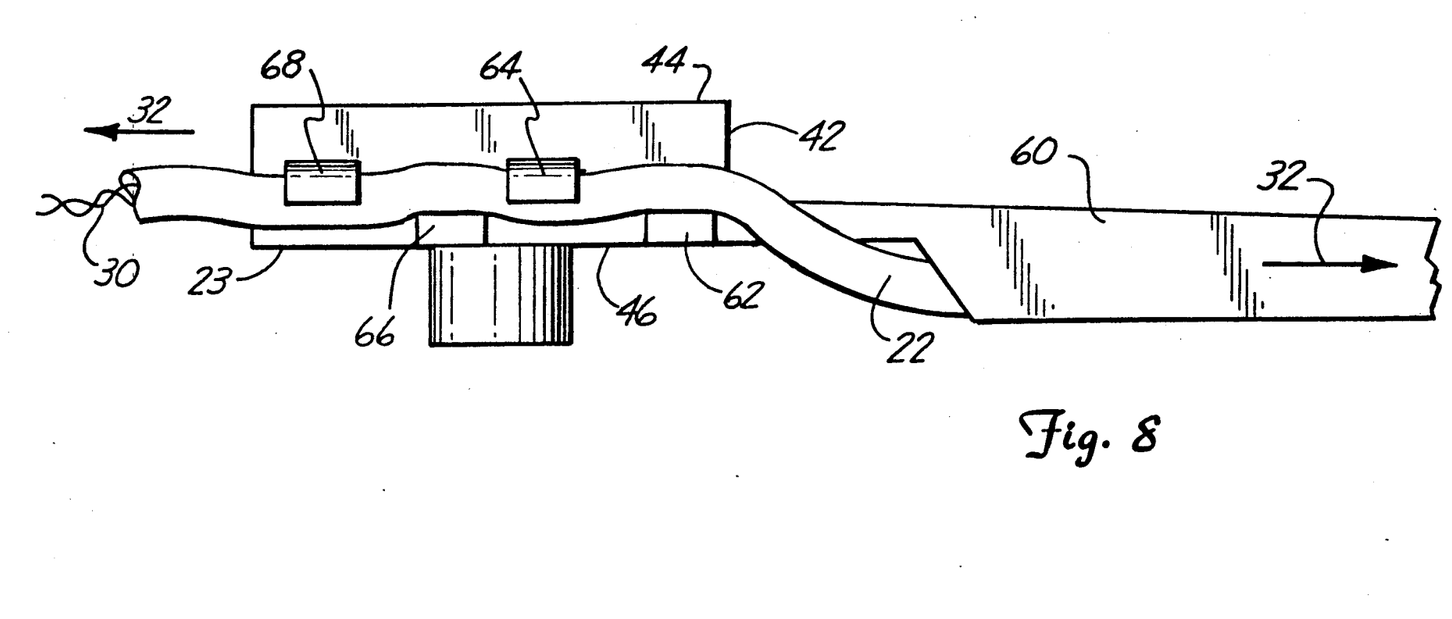
FIG. 8 is a side view of the load beam shown in FIG. 6.

FIG. 8 is a greatly enlarged side view of capture tabs 62, 64, 66 and 68 with conductor sleeve 22 threaded through them. The hook portions of tabs 64 and 68 hold conductor sleeve 22 in close proximity with the edge of load beam 60. As conductor sleeve 22 is threaded beneath tab 62, over tab 64, beneath tab 66 and over tab 68, it is snake or wave shaped. The wave shape operates as a cleat to prevent conductor sleeve 22 from sliding, within tabs 62, 64, 66 and 68, longitudinally in either direction along the edge of load beam 60.

In one preferred embodiment, the material comprising load beam 60 has a thickness of 0.003 inches and mounting plate 42 has a nominal thickness of 0.02 inches. Conductor sleeve 22 has a nominal outer diameter of 0.017 inches. Also, tabs 62, 64, 66 and 68 are formed integrally with load beam 60 and, thus, have a thickness of 0.003 inches. Ideally, a nominal clearance of 0.002 inches, to accommodate production tolerances, should exist between the top of conductor sleeve 22 and the plane of surface 46 as well as between the bottom of conductor sleeve 22 and tabs 64 and 68 and the plane of surface 44. Thus, tabs 64 and 68 are formed into shapes approximating semi-circles and extend downwardly to approximately 0.003 inches from the plane of surface 44 of mounting plate 42. Also, the capture tabs 64 and 68 are manufactured to terminate approximately 0.004 inches from the plane of surface 46. This allows sleeve 22 to snake or wave adequately, yet provide adequate clearance from the planes of surfaces 44 and 46.

In addition, in this preferred embodiment, tabs 62 and 66 are formed with a substantially identical length to width ratio and a length approximately twice that of the outer diameter of conductor sleeve 22. In plan view, capture tabs 64 and 68 have length and width dimensions substantially the same as tabs 62 and 66. The spacing between capture tabs 62, 64, 66 and 68 is approximately 1½ times the outer diameter of sleeve 22. Also, in the preferred embodiment, capture tab 62, the capture tab closest to the gimbal end of load beam 60, is an unformed capture tab, as shown in FIG. 8. The formed and unformed capture tabs alternate along the edge of load beam 60.

Sleeve 22 is formed of a material such as Teflon TFE which is flexible to facilitate weaving it through capture tab 62, 64, 66 and 68, yet stiff enough to retain its position within the four capture tabs. Thus, conductor sleeve 22 cannot escape from the capture tabs unless deliberately removed. The waviness acts to cleat the sleeve within the capture tabs to prevent the sleeve from moving longitudinally within the capture tabs.

It should be noted that the inventive capture tab design could be implemented using other embodiments. For example, three or five capture tabs could be used instead of the preferred four. Also, the formed and unformed capture tabs could be interchanged and the direction of the hook portion of the formed capture tabs could be reversed.

CONCLUSION

The present invention provides an apparatus for routing conductor sleeve 22 and conductors 30 along the edge of load beam 60. The present invention provides formed and unformed capture tabs 62, 64, 66 and 68. An assembler is capable of threading conductor sleeve 22 through the capture tabs without the use of any tooling aids. Also, conductor sleeve 22 remains in place within the capture tabs without the assembler performing the additional step of bending the capture tabs closed. Further, the capture tabs are formed to provide adequate clearance for the swaging or ball-staking technique without requiring the assembler to perform the step of compressing the capture tabs into an oblong shape.

By eliminating the step of compressing the capture tabs, several advantages are achieved. First, the time required to assemble the HGA is reduced. Second, incidents of damage to conductor sleeve 22 and conductors 30 are reduced thereby increasing yield. Also, the additional step of manually removing metal burrs from the capture tabs (which are created by the compression step) is eliminated.

Eliminating the production steps and reject HGAs associated with closure and compression of the capture tabs of the prior art decreases cost and increases yield.

Although the present invention has been described with reference to preferred embodiments, workers skilled in the art will recognize that changes may be made in form and detail without departing from the spirit and scope of the invention.

What is claimed is:

1. A sleeve capture apparatus suitable for use with a load beam, the load beam used for coupling a gimbal to a support arm in a head-gimbal assembly and the sleeve capture apparatus for supporting a conductor sleeve running from the gimbal to the support arm along the load beam, the sleeve capture apparatus comprising:
   a first capture member extending from an edge of the load beam and having a sleeve contact surface for contacting the conductor sleeve;
   a second capture member extending from the edge of the load beam and having a sleeve contact surface for contacting the conductor sleeve; and
   a third capture member extending from the edge of the load beam and having a sleeve contact surface for contacting the conductor sleeve, where the second capture member has its sleeve contact surface displaced from a line defined generally by the sleeve contact surfaces of the first and third capture members by a distance less than the thickness of the conductor sleeve.

2. The apparatus of claim 1 wherein the sleeve contact surface of at least one of the capture members has a contour which is bent to wrap around at least a portion of the conductor sleeve.

3. The apparatus of claim 2 wherein the second capture member has the sleeve contact surface which is bent to wrap around at least a portion of the conductor sleeve.

4. The apparatus of claim 3 wherein the second capture member is located generally between the first and third capture members along the edge of the load beam.

5. The apparatus of claim 4 wherein the contour of the bent sleeve contact surface forms a semi-circle.

6. The apparatus of claim 4 and further comprising:

a fourth capture member extending from the edge of the load beam and having a sleeve contact surface for contacting the conductor sleeve.

7. The apparatus of claim 6 wherein the sleeve contact surface of the fourth capture member has a contour which is bent to wrap around at least a portion of the conductor sleeve.

8. The apparatus of claim 7 wherein the sleeve contact surface of the fourth capture member is linearly displaced from the line defined by the sleeve contact surfaces of the first and third capture members by a distance less than the thickness of the conductor sleeve.

9. The apparatus of claim 8 wherein the third capture member is located generally between the second and fourth capture members along the edge of the load beam.

10. The apparatus of claim 9 wherein the contour of the bent sleeve contact surface forms a semi-circle.

11. The apparatus of claim 6 and further comprising:
    a plurality of additional capture members extending from the edge of the load beam, each having a sleeve contact surface for contacting the conductor sleeve.

12. The apparatus of claim 11 wherein the capture members are formed integrally with the load beam.

13. An apparatus suitable for coupling a conductor sleeve to a load beam in a head-gimbal assembly, the apparatus comprising:
    a first capture member extending from an edge of the load beam and having a sleeve contact surface for supporting the conductor sleeve in a first direction;
    a second capture member extending from the edge of the load beam and having a sleeve contact surface for supporting the conductor sleeve in a second direction, where the first and second directions are generally opposite one another;
    a third capture member extending from the edge of the load beam and having a sleeve contact surface for supporting the conductor sleeve in the first direction, where the conductor sleeve is supported by the apparatus primarily along a support axis, the support axis being generally transverse to the first and second directions, and where the second capture member is located generally between the first and third capture members.

14. The apparatus of claim 13 wherein the sleeve contact surface of the second capture member is separated from the sleeve contact surfaces of the first and third capture members, the sleeve contact surfaces of the first, second and third capture members being positioned generally along the support axis by a displacement distance measured perpendicular to the support axis and being less than the thickness of the conductor sleeve.

15. The apparatus of claim 14 wherein at least one of the sleeve contact surfaces has a bent contour for wrapping around a portion of the conductor sleeve.

16. The apparatus of claim 15 wherein the sleeve contact surface of the second capture member has the bent contour.

17. The apparatus of claim 15 wherein the sleeve contact surfaces of the first and second capture members have bent contours.

18. The apparatus of claim 17 wherein the bent contour comprises a semi-circle.

19. The apparatus of claim 15 and further comprising:
    a fourth capture member extending from the edge of the load beam and having a sleeve contact surface for supporting the conductor sleeve in the second direction.

20. The apparatus of claim 19 wherein the sleeve contact surface of the fourth capture member is separated from the sleeve contact surfaces of the first and third capture members along the support axis by a displacement distance less than the thickness of the conductor sleeve.

21. The apparatus of claim 20 wherein the fourth capture member has the bent contour.

22. The apparatus of claim 21 wherein the third capture member is located generally between the second and fourth capture members along the support axis.

23. The apparatus of claim 22 wherein the second capture member has the bent contour.

24. The apparatus of claim 19 and further comprising:
a plurality of additional capture members extending from the edge of the load beam, each having a sleeve contact surface for supporting the conductor sleeve.

25. The apparatus of claim 24 wherein the capture members are formed integrally with the load beam.

26. A load beam suitable for coupling a gimbal to a support arm and a head-gimbal assembly and for supporting a conductor sleeve running from the gimbal to the support arm along the load beam, comprising:
a resilient section with a first end for attachment to the support arm and a second end;
a substantially rigid section having a first end coupled to the second end of the resilient section and a second end for attachment to the gimbal;
a first capture member extending from an edge of the first end of the load beam and having a sleeve contact surface for contacting the conductor sleeve;
a second capture member extending from the edge of the load beam and having a sleeve contact surface for contacting the conductor sleeve; and
a third capture member extending from the edge of the load beam and having a sleeve contact surface for contacting the conductor sleeve, where the second capture member has its sleeve contact surface displaced from a line defined generally by the sleeve contact surfaces of the first and third capture members by a distance less than the thickness of the conductor sleeve.

27. The apparatus of claim 26 wherein the sleeve contact surface of at least one of the capture members has a contour which is bent to wrap around at least a portion of the conductor sleeve.

28. The apparatus of claim 27 wherein the second capture member has the sleeve contact surface which is bent to wrap around at least a portion of the conductor sleeve.

29. The apparatus of claim 28 wherein the second capture member is located generally between the first and third capture members along the edge of the load beam.

30. The apparatus of claim 29 wherein the contour of the bent sleeve contact surface forms a semi-circle.

31. The apparatus of claim 29 and further comprising:
a fourth capture member extending from the edge of the load beam and having a sleeve contact surface for contacting the conductor sleeve.

32. The apparatus of claim 31 wherein the sleeve contact surface of the fourth capture member has a contour which is bent to wrap around at least a portion of the conductor sleeve.

33. The apparatus of claim 32 wherein the sleeve contact surface of the fourth capture member is linearly displaced from the line defined by the sleeve contact surfaces of the first and third capture members by a distance less than the thickness of the conductor sleeve.

34. The apparatus of claim 33 wherein the third capture member is located generally between the second and fourth capture members along the edge of the load beam.

35. The apparatus of claim 34 wherein the contour of the bent sleeve contact surface forms a semi-circle.

36. The apparatus of claim 31 and further comprising:
a plurality of additional capture members extending from the edge of the load beam, each having a sleeve contact surface for contacting the conductor sleeve.

37. The apparatus of claim 36 wherein the capture members are formed integrally with the load beam.

38. A head-gimbal assemble (HGA) suitable for being connected to a support arm for moving the HGA about an axis of rotation in a magnetic recording system where information is recorded on and retrieved from a magnetic disk, comprising:
a transducer for recording and retrieving the information;
a slider, coupled to the transducer, for providing a lifting force to allow the transducer to fly over the disk;
a gimbal, coupled to the slider, for providing a resilient connection to the slider;
a load beam having a first end coupled to the support arm and having a second end coupled to the gimbal;
conductor means, coupled to the transducer and the load beam, for carrying electric signals to and from the transducer;
a first capture member extending from an edge of the first end of the load beam and having a contact surface for supporting the conductor means;
a second capture member extending from the edge of the load beam and having a contact surface for supporting the conductor means; and
a third capture member extending from the edge of the load beam and having a contact surface for supporting the conductor means, where the second capture member has its contact surface displaced from a line defined generally by the contact surfaces of the first and third capture members by a distance less than the thickness of the conductor means.

39. The apparatus of claim 38 wherein the contact surface of at least one of the capture members has a contour which is bent to wrap around at least a portion of the conductor means.

40. The apparatus of claim 39 wherein the second capture member has the sleeve contact surface which is bent to wrap around at least a portion of the conductor means.

41. The apparatus of claim 40 wherein the second capture member is located generally between the first and third capture members along the edge of the load beam.

42. The apparatus of claim 41 wherein the contour of the bent sleeve contact surface forms a semi-circle.

43. The apparatus of claim 41 and further comprising:
a fourth capture member extending from the edge of the load beam and having a contact surface for contacting the conductor means.

44. The apparatus of claim 43 wherein the contact surface of the fourth capture member has a contour which is bent to wrap around at least a portion of the conductor means.

45. The apparatus of claim 44 wherein the contact surface of the fourth capture member is linearly displaced from the line defined by the contact surfaces of the first and third capture members by a distance less than the thickness of the conductor means.

46. The apparatus of claim 45 wherein the third capture member is located generally between the second and fourth capture members along the edge of the load 47. The apparatus of claim 46 wherein the contour of the bent contact surface forms a semi-circle.

48. The apparatus of claim 43 and further comprising:
 a plurality of additional capture members extending from the edge of the load beam, each having a contact surface for contacting the conductor means.

49. The apparatus of claim 39 wherein the capture members are formed integrally with the load beam.

50. The apparatus of claim 38 wherein the conductor means comprises:
 at least one wire; and
 a conductor sleeve disposed about the periphery of the wire.

* * * * *

UNITED STATES PATENT AND TRADEMARK OFFICE
CERTIFICATE OF CORRECTION

PATENT NO. : 5,027,239

DATED : June 25, 1991

INVENTOR(S) : Tracy M. Hagen

It is certified that error appears in the above-identified patent and that said Letters Patent is hereby corrected as shown below:

Title page, item (56): References Cited Section, under FOREIGN
PATENT DOCUMENTS, insert the following:

2477310                             France     2526570                             France Signed and Sealed this Seventh Day of September, 1993

*Attest:*

*Attesting Officer*

BRUCE LEHMAN

*Commissioner of Patents and Trademarks*